United States Patent
Milam

[11] 3,814,503
[45] June 4, 1974

[54] ULTRA-FAST TERMINATOR FOR INTENSE LASER PULSES

[75] Inventor: David Milam, Burlington, Mass.

[73] Assignee: The United States of America as represented by the Secretary of the Air Force, Washington, D.C.

[22] Filed: Feb. 7, 1973

[21] Appl. No.: 330,366

[52] U.S. Cl. .................. 350/160 R, 331/94.5 A
[51] Int. Cl. ............................ G02f 1/36
[58] Field of Search .......... 350/160 R; 331/94.5 A; 315/149

[56] References Cited
UNITED STATES PATENTS 3,295,011   12/1966   Barbini ............... 331/94.5 A
3,433,553   3/1969   Tomlinson ............ 350/160 R Primary Examiner—Ronald L. Wibert
Assistant Examiner—V. P. McGraw
Attorney, Agent, or Firm—Harry A. Herbert, Jr.; George Fine

[57] ABSTRACT

An ultra-fast terminator for laser pulses is provided in which plasma produced by firing a laser-triggered spark gap is used to speed and enhance the formation of a highly opaque plasma across the focal plane of a laser beam. The additional plasma contributed by the spark gap serves to prevent leakage of the beam past the plasma created by the laser itself.

5 Claims, 1 Drawing Figure

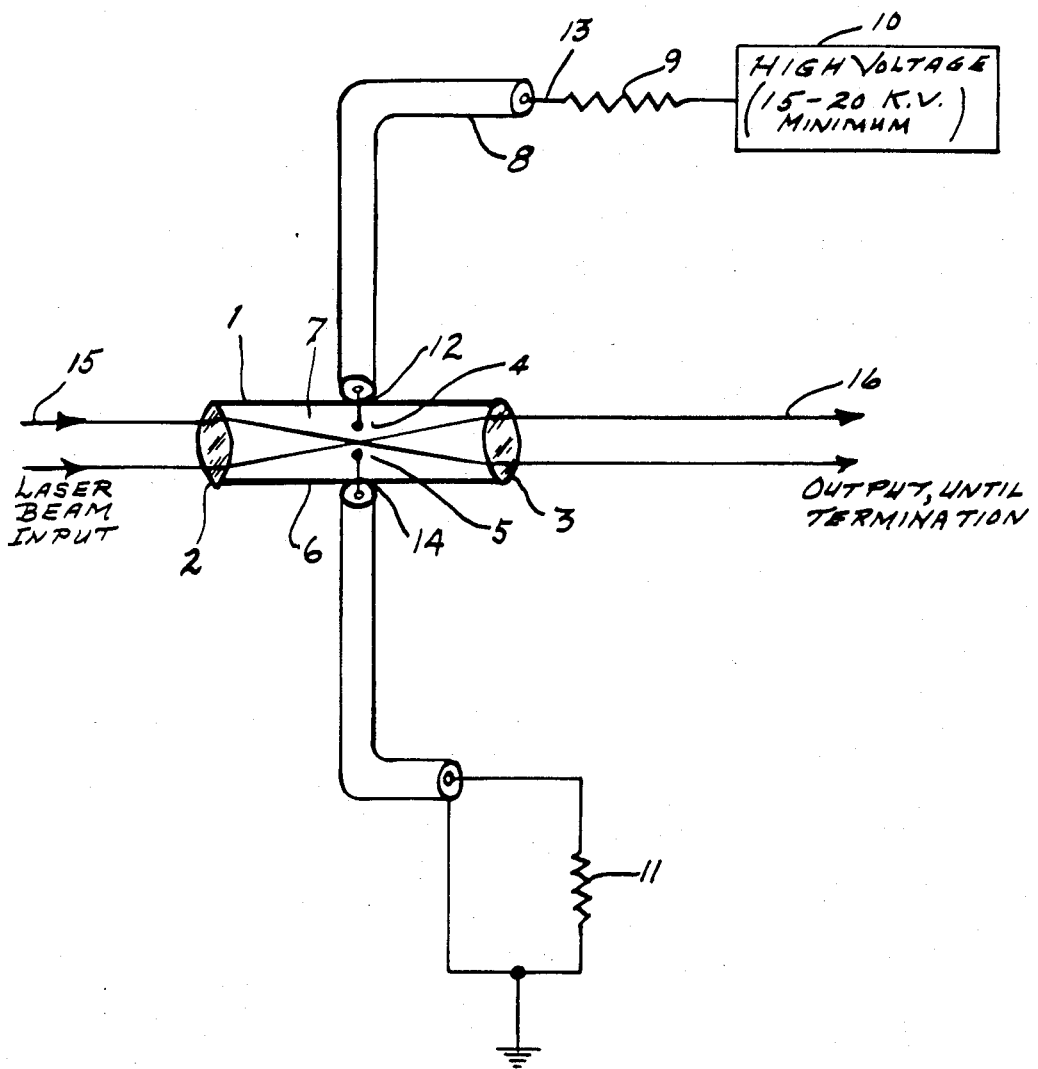

ULTRA-FAST TERMINATOR FOR INTENSE LASER PULSES

BACKGROUND OF THE INVENTION

Lasers are powerful, directional, coherent, and monochromatic. The very short wavelengths produced by lasers in the optical region permit very narrow beam angles.

The intensity of the parallel beam can exceed $10^9$ watts/cm$^2$, which is sufficient to destroy many optical materials and multilayer dielectric elements. The beam can be focused by a lens or mirror to a point, or at least into a small volume comparable in dimensions to the wavelength. Since this is a very small area, the laser beam can produce an enormous power density at the focal spot. Pulsed power densities on the order of $10^{15}$ watts/cm$^2$ have been attained.

Since lasers are capable of producing pulses of high intensity, there exists a concurrent need for the control thereof. Accordingly, the present invention provides a control device that can be used in most configurations requiring rapid termination of intense pulses; for example, as a fail-safe between intense lasers and auxiliary systems to guarantee that beams exceeding a preset intensity are prevented from reaching and damaging the auxiliary system. It is also true that one might desire to terminate a pulse even in cases in which damage is not a problem. For example, if the laser beam is used to "excite" a secondary material thereby causing the secondary material itself to emit light, the time history of light emission can best be followed if the exciting laser beam is abruptly terminated after having brought the secondary material to the desired state of excitation.

SUMMARY OF THE INVENTION

An ultra-fast terminator for intense laser pulses is provided. A laser beam is brought to a focus between the electrodes of a low-inductance, laser-triggered spark gap, and then recollimated by a second lens as it diverges from the gap. When the intensity at the focus exceeds a preset level, laser-induced gas breakdown occurs, and the spark gap is triggered. The remainder of the laser pulse is absorbed in the dense plasma produced by firing the spark gap and by the laser-induced breakdown itself, thereby terminating the laser pulse. Termination can be made to occur in times on the order of $10^{-10}$ sec.

DESCRIPTION OF THE DRAWING

There is shown in the single FIGURE of this invention the preferred embodiment of an ultra-fast terminator for intense laser pulses.

DETAILED DESCRIPTION OF THE PREFERRED EMBODIMENT

Now referring in detail to the single FIGURE, there is shown high pressure gas cell 1 which includes input focusing lens 2, output recollimating lens 3, spark gap electrodes 4 and 5 having a preselected separation, gas cell housing 6, and gas 7. Gas 7 utilized in gas cell 1 may be of the conventional type such as nitrogen, helium, argon, or any other suitable type that can be employed for spark gap purposes and in addition capable of forming plasma. It is also possible to use a combination of gases in accordance with desired results. The gas pressure in the cell may also be varied in accordance with desired results. Gas cell 1 is so constructed and sealed as to permit the retention of gas therein at a preselected pressure using conventional techniques.

Two-ohm coaxial cable 8 is utilized to provide a preselected high voltage across spark gap electrodes 4 and 5. Center conductor 13 of cable 8 is connected at one end to high voltage source 10 by way of resistor 9. High voltage source 10 permits the utilization of a voltage having a minimum magnitude of 15–20 KV. Center conductor 13 is connected to electrodes 4 and 5 at points 12 and 14, respectively. Resistor 11 is connected between center conductor 13 and ground and serves as a 2 ohm load. There is thus provided a low-inductance spark gap connected to a preselected high voltage.

Laser beam input 15 may be comprised of pulses and is directed toward input lens 2. Lens 2 is selected so as to focus the laser beam between spark gap electrodes 4 and 5. The laser beam is recollimated by output lens 3 as it diverges from the gap and is then available for utilization therefrom. When the intensity at the focus exceeds a preset level, laser induced gas breakdown occurs and the low-inductance spark gap is triggered. The remainder of the laser pulse is absorbed in the dense plasma produced by the combination of firing the spark gap and by the laser-induced breakdown itself, thereby most effectively and positively terminating the laser pulse. Ultra-fast termination can be made to occur in times on the order of $10^{-10}$ sec. High quality lenses must be used to maintain the beam in a usable state until breakdown and termination occurs.

The intensity at which breakdown occurs can be precisely adjusted by varying either largely or in combination the lens focal length, spark gap voltage, gas pressure, gas composition, gap dimensions, etc. Thus, the device of the present invention may terminate a laser pulse at a precisely predetermined preselected intensity at the focal point of the spark gap merely by a judicious selection of one or a combination of the aforementioned parameters.

It is noted that, other conditions being held constant, breakdown at lower intensities is achieved by use of a shorter focal length lens or by increasing the voltage across the gap. With a given voltage across the gap, a given gas at a given pressure will break down at a given intensity.

It is emphasized that the novel feature of the invention is the use of the plasma produced by firing the laser-triggered low-inductance spark gap to speed and enhance the formation of a highly opaque plasma across the focal plane of the laser beam. The additional plasma contributed by the low-inductance spark gap serves to prevent leakage of the beam past the plasma created by the laser itself. Thus, it is clear that for ultra-fast termination of an intense laser pulse, a low-inductance spark gap is required and also the combination of firing the spark gap by the laser-induced breakdown itself.

It is also noted that the time of termination of the laser pulse may be controlled in addition to termination at a preset level. This is accomplished by a selection of the aforementioned parameters made on the basis of a faster breakdown within the gas cell.

What is claimed is:

1. An ultra-fast terminator of intense laser pulses of a beam at a preset intensity level comprising a sealed gas cell, said gas cell including a very low-inductance spark gap, said low-inductance spark gap having two electrodes of preselected dimensions and preselected separation therebetween, a preselected gas at a preselected pressure, an input lens having a preselected focal length to focus input laser pulses of said beam between the separated two electrodes, an output lens to recollimate said laser pulses of said beam upon diverging from between said two electrodes, and a very high voltage source connected to said spark gap, upon reaching said preset intensity level laser-induced gas breakdown occurs to trigger said spark gap with the remainder of the laser pulse being absorbed in the dense plasma produced at the focal plane by firing said spark gap and by the laser-induced breakdown itself thus terminating the laser pulse.

2. An ultra-fast terminator as described in claim 1 further including a low-inductance pulse-forming cable which matches the impedance of the low-impedance spark gap.

3. An ultra-fast terminator as described in claim 2 further including a resistor interposed between said very high voltage source and said low-inductance pulse-forming cable.

4. An ultra-fast terminator as described in claim 1 wherein the electrical pulse produced by firing said low-inductance spark gap is transmitted by a matching low-inductance line to a matching low-inductance terminating load.

5. An ultra-fast terminator as described in claim 3 further including an additional gas in said gas cell to achieve a preselected composition of gas.

* * * * *